US012671314B2

(12) United States Patent (10) Patent No.: US 12,671,314 B2
Su (45) Date of Patent: Jun. 30, 2026

(54) VOLTAGE CONVERSION SYSTEM AND CONTROL METHOD THEREOF

(71) Applicant: PowerX Semiconductor Corporation, Hsinchu County (TW)

(72) Inventor: Chih-Chieh Su, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 357 days.

(21) Appl. No.: 18/461,526

(22) Filed: Sep. 6, 2023

(65) Prior Publication Data

US 2024/0322669 A1 Sep. 26, 2024

(30) Foreign Application Priority Data

Mar. 20, 2023 (TW) ................................. 112110296

(51) Int. Cl.
*H02M 3/158* (2006.01)
*H02M 1/00* (2007.01)
*H02M 1/084* (2006.01)

(52) U.S. Cl.
CPC ......... *H02M 1/084* (2013.01); *H02M 1/0032* (2021.05); *H02M 3/158* (2013.01)

(58) Field of Classification Search
CPC ............. H02M 3/1584; H02M 3/1586; H02M 1/0032; H02M 1/325; H02M 1/327
See application file for complete search history.

(56) References Cited

U.S. PATENT DOCUMENTS

| | | | |
|---|---|---|---|
| 8,228,049 B2 | 7/2012 | Qiu et al. | |
| 8,829,872 B1 | 9/2014 | Pierson et al. | |
| 9,606,559 B2 | 3/2017 | Ozawa | |
| 11,081,954 B2 | 8/2021 | Jiang et al. | |
| 11,342,848 B2 | 5/2022 | Luo | |
| 2009/0179619 A1 | 7/2009 | Houston | |
| 2016/0233766 A1* | 8/2016 | Todorov | H02M 3/1584 |
| 2016/0359421 A1 | 12/2016 | Lin et al. | |
| 2019/0207518 A1* | 7/2019 | Wu | G01R 29/033 |
| 2020/0007023 A1* | 1/2020 | Wu | H02M 3/1584 |
| 2020/0373842 A1* | 11/2020 | Chen | H02M 7/483 |

(Continued)

FOREIGN PATENT DOCUMENTS

| | | |
|---|---|---|
| CN | 106549590 A | 3/2017 |
| TW | 200513818 A | 4/2005 |

(Continued)

*Primary Examiner* — Sisay G Tiku
(74) *Attorney, Agent, or Firm* — CKC & Partners Co., LLC

(57) ABSTRACT

A voltage conversion system includes a multi-phase voltage converter and a controller. The multi-phase voltage converter is coupled to a load. A first phase circuit, a second phase circuit, and a third phase circuit in the multi-phase voltage converter enter a charging state in sequence during a first period. At least one driver circuit in the multi-phase voltage converter is coupled to the first phase circuit, the second phase circuit, and the third phase circuit. The controller is coupled to the at least one driver circuit. According to a trigger event, the controller outputs at least one driving signal to the at least one driver circuit such that the at least one driver circuit adjusts the second phase circuit or the third phase circuit to be an activation item with highest priority during a second period after the first period.

8 Claims, 6 Drawing Sheets

(56)          References Cited

U.S. PATENT DOCUMENTS

| 2021/0288578 | A1* | 9/2021 | Luo | H02M 1/088 |
| 2021/0288580 | A1* | 9/2021 | Luo | H02M 3/1584 |
| 2022/0368230 | A1* | 11/2022 | Kshirsagar | H02J 1/102 |
| 2024/0037057 | A1* | 2/2024 | Zou | H02M 1/36 |
| 2025/0300562 | A1* | 9/2025 | Hu | H02M 3/1584 |

FOREIGN PATENT DOCUMENTS

| TW | 201904178 | A | 1/2019 |
| TW | 1779290 | B | 10/2022 |
| TW | M643437 | U | 7/2023 |

* cited by examiner

600

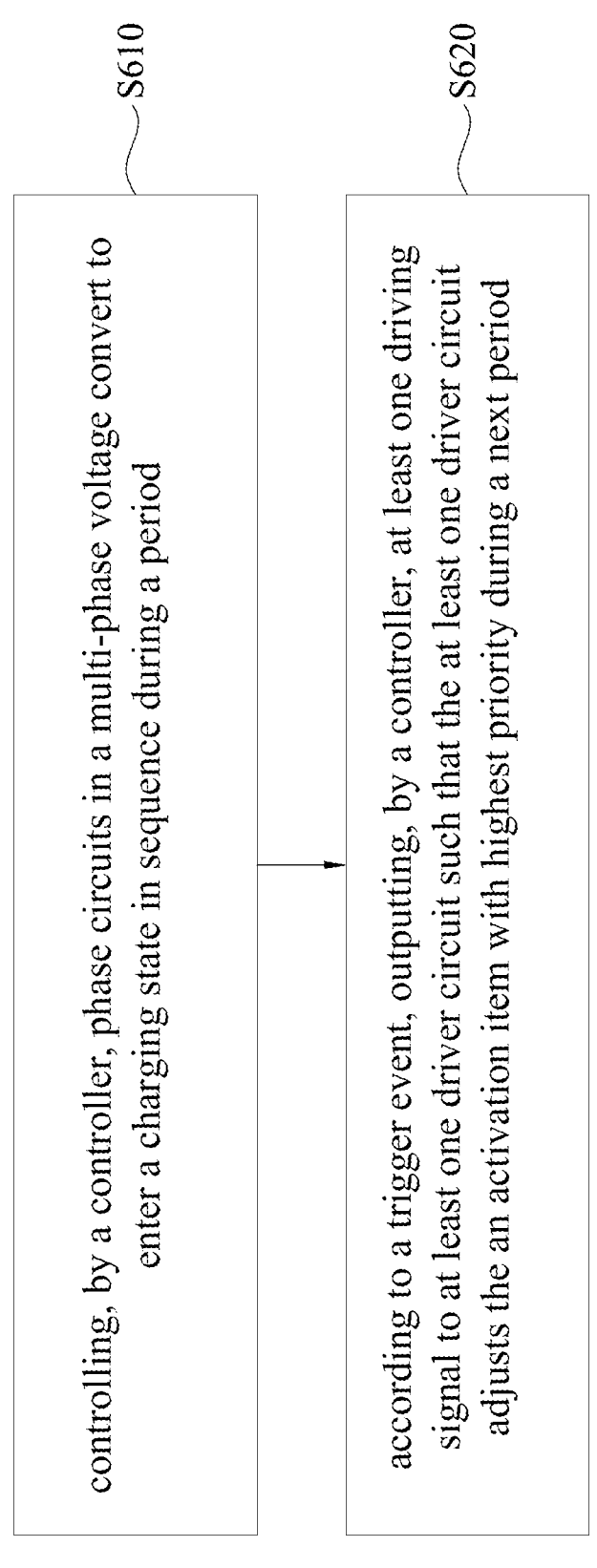

S610 controlling, by a controller, phase circuits in a multi-phase voltage convert to enter a charging state in sequence during a period

S620 according to a trigger event, outputting, by a controller, at least one driving signal to at least one driver circuit such that the at least one driver circuit adjusts the an activation item with highest priority during a next period

FIG. 6

VOLTAGE CONVERSION SYSTEM AND CONTROL METHOD THEREOF

RELATED APPLICATIONS

This application claims priority to Taiwanese Application Serial Number 112110296, filed Mar. 20, 2023, which is herein incorporated by reference.

BACKGROUND

Technical Field

The present disclosure relates to phase-shedding technology. More particularly, the present disclosure relates to a voltage conversion system with an auto phase-shedding mechanism and a control method thereof.

Description of Related Art

With the progress of technologies, various integrated circuits have been developed. For example, a voltage converter can provide a current to its output terminal to supply power to a load coupled to the output terminal. A multi-phase voltage converter of the voltage converter includes multiple groups of power switches to supply power to the load adaptively. However, it is one of important issues in this field to improve the reliability of the multi-phase voltage converter.

SUMMARY

Some aspects of the present disclosure provide a voltage conversion system. The voltage conversion system includes a multi-phase voltage converter and a controller. The multi-phase voltage converter is coupled to a load. The multi-phase voltage converter includes a first phase circuit, a second phase circuit, a third phase circuit, and at least one driver circuit. The first phase circuit, the second phase circuit, and a third phase circuit enter a charging state in sequence during a first period. The at least one driver circuit is coupled to the first phase circuit, the second phase circuit, and the third phase circuit. The controller is coupled to the at least one driver circuit. According to a trigger event, the controller outputs at least one driving signal to the at least one driver circuit such that the at least one driver circuit adjusts the second phase circuit or the third phase circuit to be an activation item with highest priority during a second period after the first period.

Some aspects of the present disclosure provide a control method of a voltage conversion system. The control method includes following operations: controlling, by a controller, that a first phase circuit, a second phase circuit, and a third phase circuit in a multi-phase voltage converter enter a charging state in sequence during a first period; and according to a trigger event, outputting, by the controller, at least one driving signal to at least one driver circuit such that the at least one driver circuit adjusts the second phase circuit or the third phase circuit to be a activation item with highest priority during a second period after the first period.

BRIEF DESCRIPTION OF THE DRAWINGS

The disclosure can be more fully understood by reading the following detailed description of the embodiment, with reference made to the accompanying drawings as follows:

FIG. 6 is a flow diagram of a control method according to some embodiments of the present disclosure.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
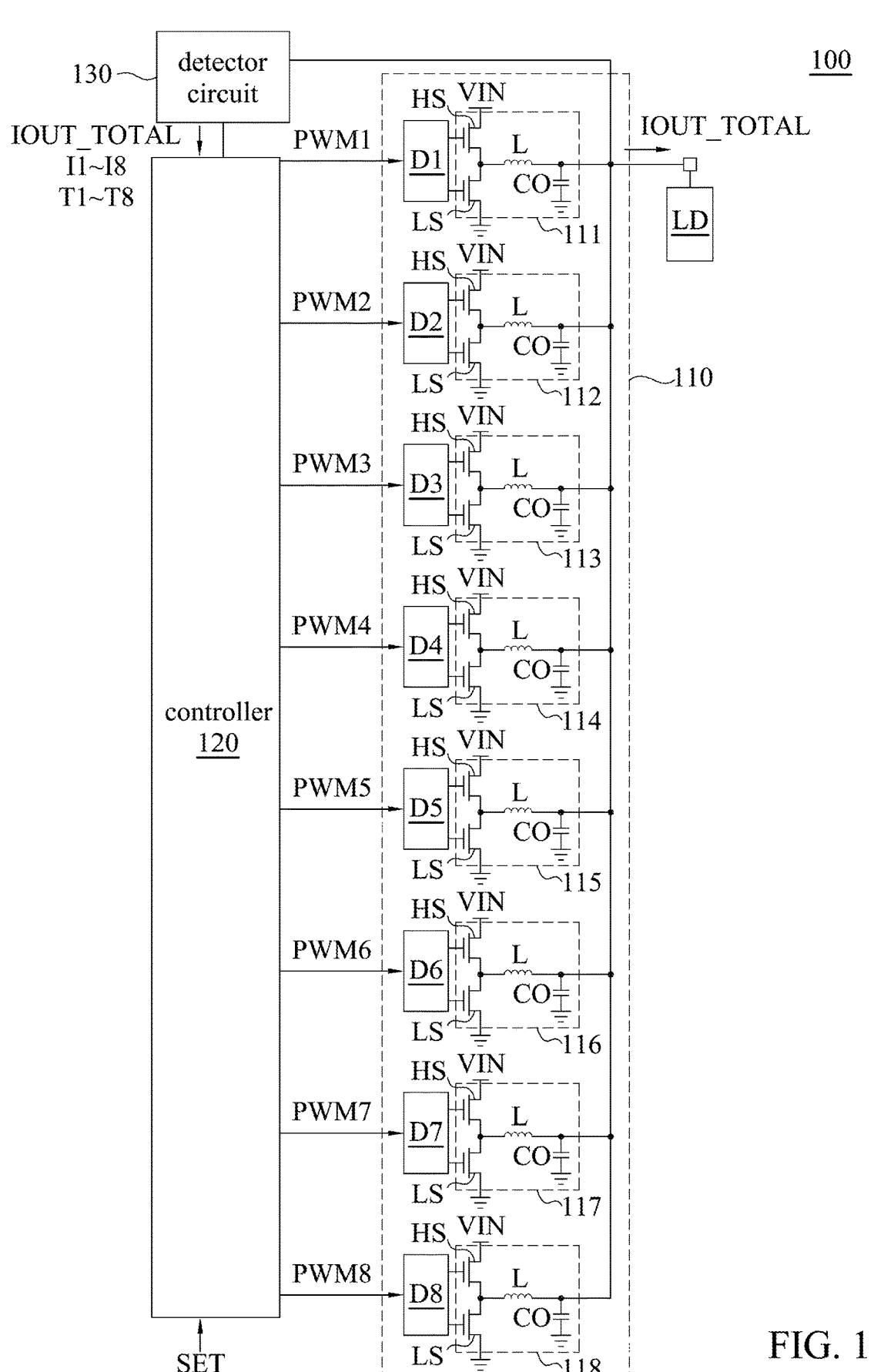
FIG. 1 is a schematic diagram of a voltage conversion system according to some embodiments of the present disclosure.

Reference is made to FIG. 1. FIG. 1 is a schematic diagram of a voltage conversion system 100 according to some embodiments of the present disclosure.

The voltage conversion system 100 includes a multi-phase voltage converter 110, a controller 120, and a detector circuit 130. The multi-phase voltage converter 110 is coupled between an input voltage VIN, the controller 120, and a load LD. In this example, the multi-phase voltage converter 110 is a multi-phase buck converter, and the multi-phase voltage converter 110 can provide a total current IOUT_TOTAL to the load LD.

The multi-phase voltage converter 110 includes driver circuits D1-D8 and phase circuits 111-118. The driver circuits D1-D8 are coupled to the phase circuits 111-118 respectively. The phase circuits 111-118 are coupled to the load LD. Each of the phase circuits 111-118 includes a high-side switch HS, a low-side switch LS, an inductor L, and a capacitor CO.

Taking the phase circuit 111 as an example, a first terminal of the high-side switch HS is configured to receive the input voltage VIN. A second terminal of the high-side switch HS is coupled to a first terminal of the low-side switch LS and a first terminal of the inductor L. A second terminal of the low-side switch LS is coupled to a ground terminal. A control terminal of the high-side switch HS and a control terminal of the low-side switch LS are coupled to the driver circuit D1. The driver circuit D1 can turn on or turn off the high-side switch HS or the low-side switch LS. A second terminal of the inductor L is coupled to a first terminal of the capacitor CO and the load LD. A second terminal of the capacitor CO is coupled to the ground terminal. Other phase circuits 112-118 have circuit structures similar to the phase circuit 111, and similar circuit structures are not described herein again. In other words, the phase circuits 111-118 are coupled in parallel.

The controller 120 can output driving signals PWM1-PWM8 according to a setting signal SET and transmit the driving signals PWM1-PWM8 to the driver circuits D1-D8 respectively. The driving signals PWM1-PWM8 are pulse width modulation (PWM) signals.

In the example demonstrated by the driver circuit D1, the driver circuit D1 can receive the driving signal PWM1 from the controller 120 and turn on or turn off the high-side switch HS and the low-side switch LS in the phase circuit 111 according to the driving signal PWM1. For example, when the driving signal PWM1 has a high logic value (e.g., a high voltage level or logic value 1), the driver circuit D1 turns on the high-side switch HS in the phase circuit 111 and turns off the low-side switch LS in the phase circuit 111. When the driving signal PWM1 has a low logic value (e.g., a low voltage level or logic value 0), the driver circuit D1 turns off the high-side switch HS in the phase circuit 111 and turns on the low-side switch LS in the phase circuit 111. When the driving signal PWM1 has a middle logic value (e.g., a middle voltage level between the high voltage level and the low voltage level), the driver circuit D1 turns off the high-side switch HS in the phase circuit 111 and the low-side switch LS in the phase circuit 111. By utilizing the driver circuit D1 to control the phase circuit 111, the phase circuit 111 can provide a current (e.g., a detection current I1 in FIG. 2) to the load LD. Other driver circuits D2-D8 have operations similar to those of the driver circuit D1, and similar operations of the driver circuits D2-D8 are not described herein again. By utilizing the driver circuits D1-D8 to control the phase circuits 111-118 to work together, the total current IOUT_TOTAL can be provided to the load LD.

In some embodiments, the controller 120 can be implemented by an Application Specific Integrated Circuit (ASIC). In some other embodiments, the controller 120 can be implemented by an analog circuit, a digital circuit, or a combination thereof.

It is noted that the quantities (e.g., there are 8 driver circuits and 8 phase circuits illustrated in FIG. 1) of the driver circuits and the phase circuits in FIG. 1 are merely for illustration. Other suitable quantities are within the scope of the present disclosure.

In some embodiments, the detector circuit 130 can detect currents of the phase circuits 111-118 to generate detection currents I1-I8 respectively and transmit the detection currents I1-I8 back to the controller 120. In some embodiments, the detector circuit 130 can further sum up the detection currents I1-I8 to generate the total current IOUT_TOTAL and transmit the total current IOUT_TOTAL back to the controller 120. In some embodiments, the detector circuit 130 can detect temperatures of the phase circuits 111-118 to generate detection temperatures T1-T8 respectively and transmit the detection temperatures T1-T8 back to the controller 120.

In some other embodiments, the detector circuit 130 can be arranged inside the controller 120.

Figure 2:
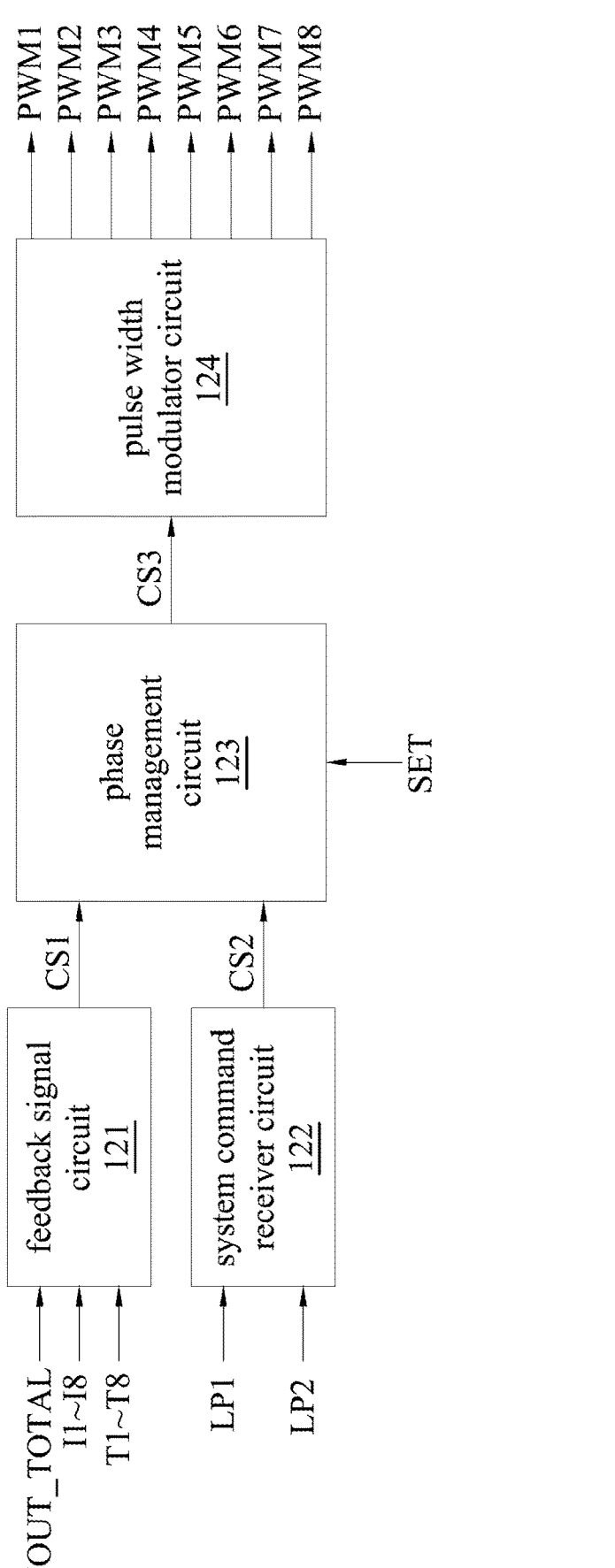
FIG. 2 is schematic diagram of operations of a controller according to some embodiments of the present disclosure.

Reference is made to FIG. 2. FIG. 2 is schematic diagram of operations of the controller 120 according to some embodiments of the present disclosure.

The controller 120 includes a feedback signal circuit 121, a system command receiver circuit 122, a phase management circuit 123, and a pulse width modulator circuit 124. The feedback signal circuit 121 and the system command receiver circuit 122 are coupled to the phase management circuit 123. The phase management circuit 123 is coupled to the pulse width modulator circuit 124.

As illustrated in FIG. 2, the feedback signal circuit 121 is configured to receive the total current IOUT_TOTAL, the detection currents I1-I8, or the detection temperatures T1-T8 from the detector circuit 130, and to generate a control signal CS1 according to the total current IOUT_TOTAL, the detection currents I1-I8, or the detection temperatures T1-T8.

The system command receiver circuit 122 can receive commands from the system. As illustrated in FIG. 2, the system command receiver circuit 122 can receive a power-saving mode command LP1 for activating a low-power state or receive another power-saving mode command LP2 for activating a sleep state. The system command receiver circuit 122 can generate a control signal CS2 according to the power-saving mode command LP1 and the power-saving mode command LP2.

The phase management circuit 123 can generate a phase management signal CS3 according to the control signal CS1, the control signal CS2, or the setting signal SET, and transmit the phase management signal CS3 to the pulse width modulator circuit 124 such that the pulse width modulator circuit 124 generates the driving signals PWM1-PWM8 and transmits the driving signals PWM1-PWM8 to the driver circuits D1-D8 respectively.

Figure 4:
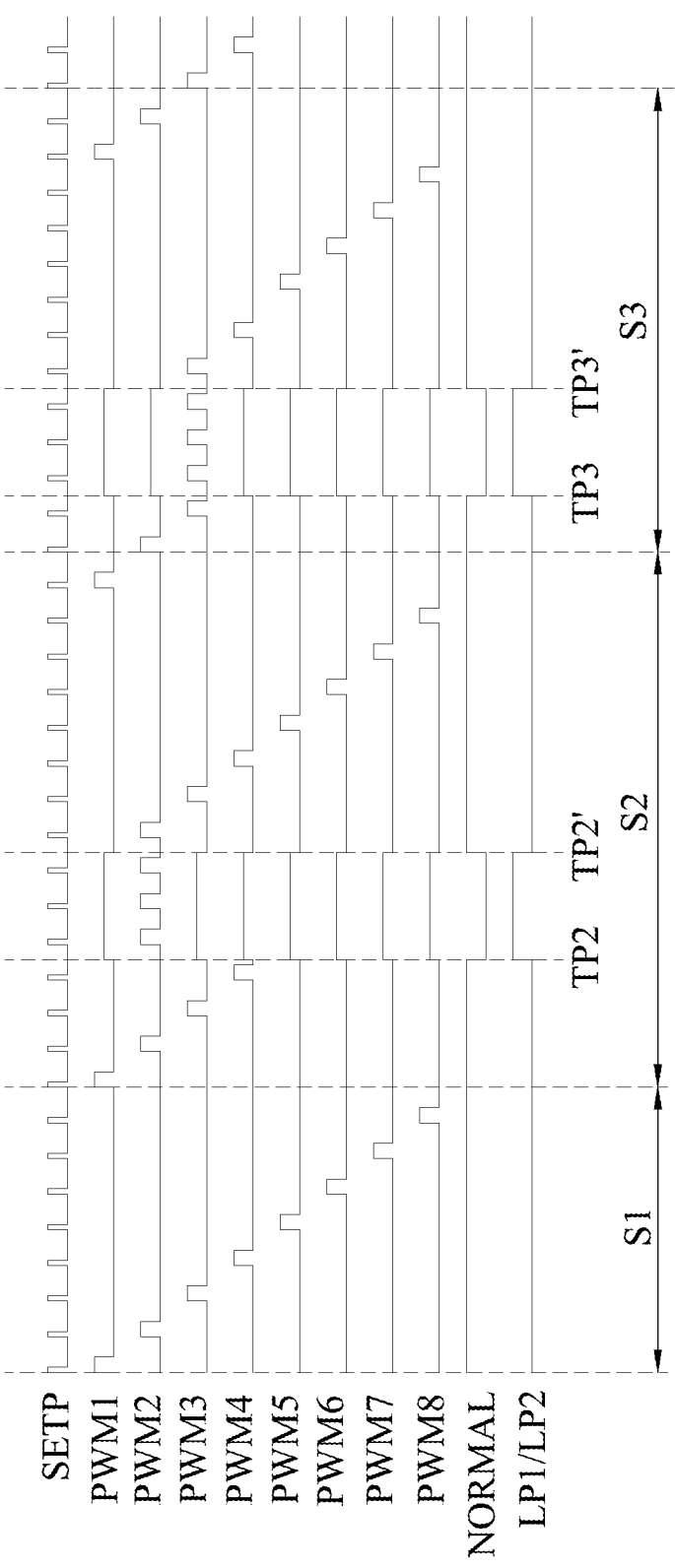
FIG. 4 is a timing diagram of a sequential definition method of a power-saving mode according to some embodiments of the present disclosure.
Figure 5:
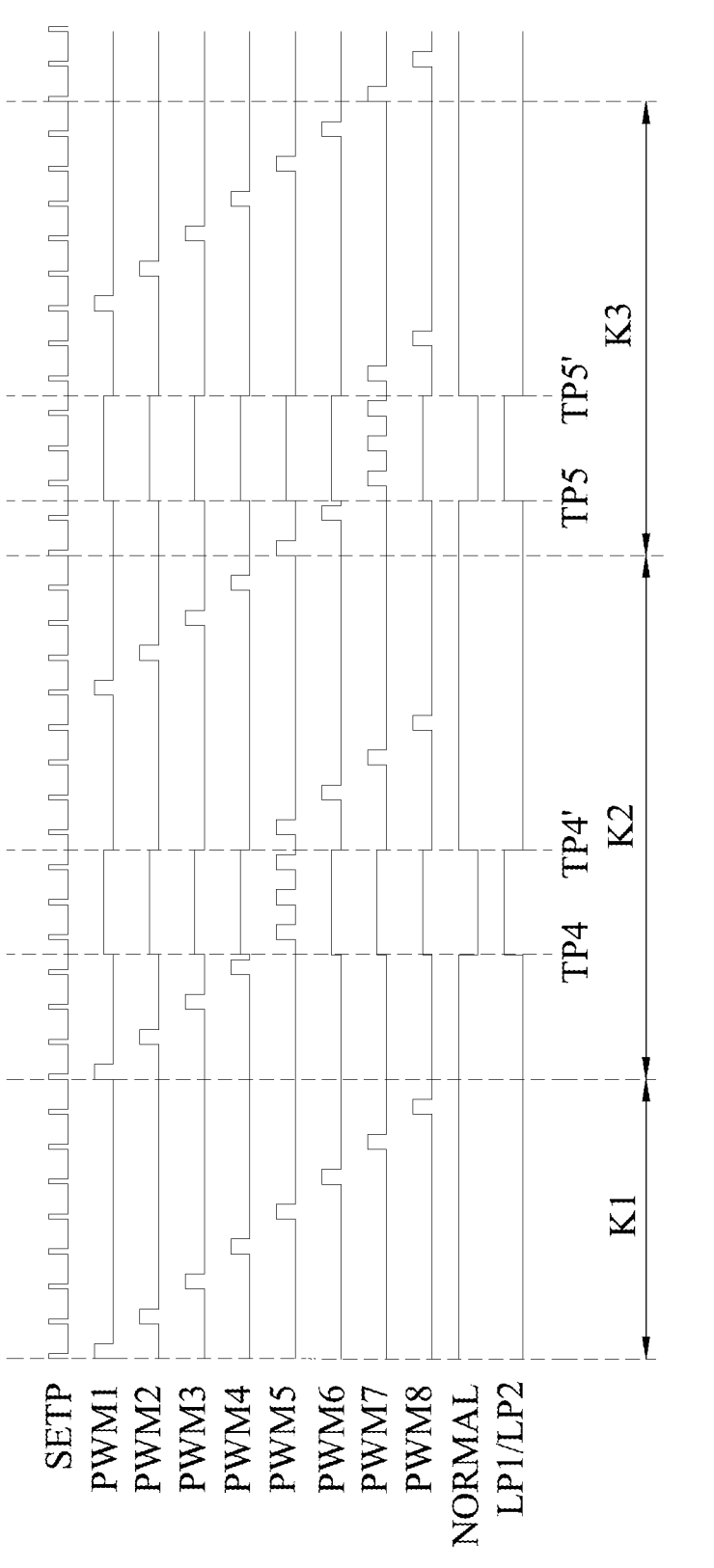
FIG. 5 is a timing diagram of a random definition method of a power-saving mode according to some embodiments of the present disclosure.

In the present disclosure, the controller 120 can change an activation order of the phase circuits 111-118 according to a trigger event. Different types of trigger events in FIG. 3, FIG. 4, and FIG. 5 are described below.

Figure 3:
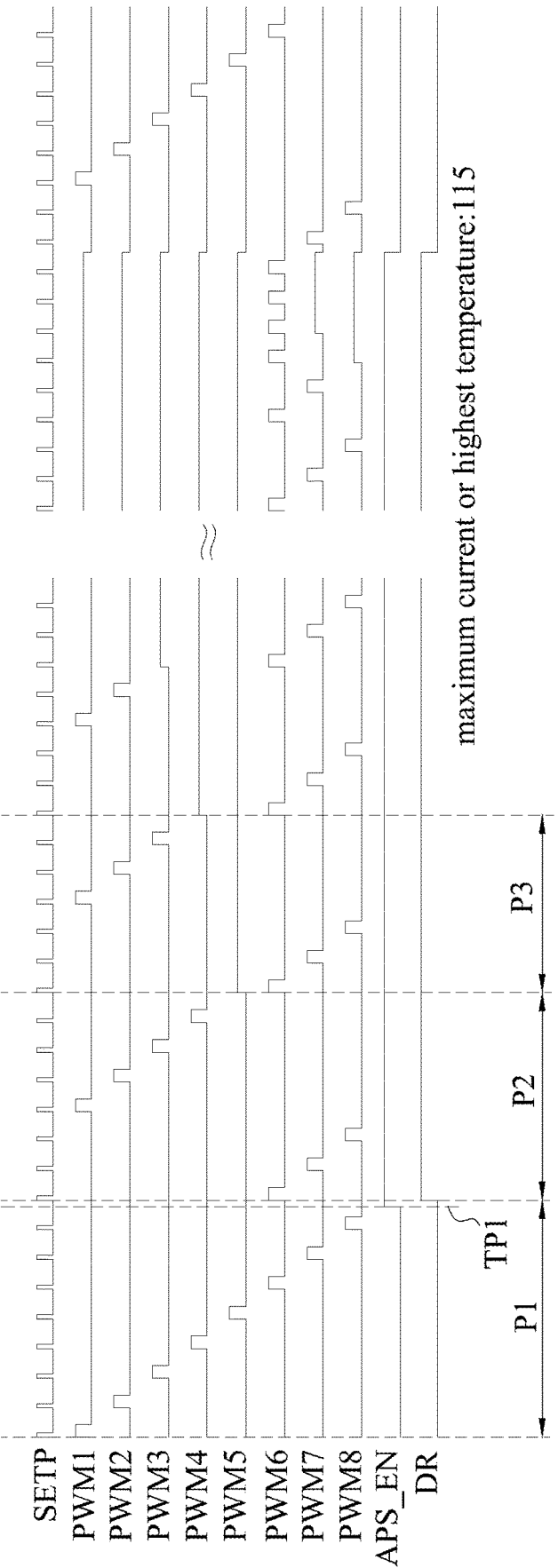
FIG. 3 is a timing diagram of a non-power-saving mode according to some embodiments of the present disclosure.

References are made to FIG. 1, FIG. 2, and FIG. 3. FIG. 3 is a timing diagram of a non-power-saving mode according to some embodiments of the present disclosure. In some embodiments, when both of the power-saving mode command LP1 and the power-saving mode command LP2 in FIG. 2 have the low logic value, it represents that the system is in the non-power-saving mode (normal mode).

As illustrated in FIG. 3, each of the driving signals PWM1-PWM8 can have at least one pulse. One pulse corresponds to a high logic value and a low logic value. For example, as described above, when the driving signal PWM1 has the high logic value, the driver circuit D1 turns on the high-side switch HS in the phase circuit 111 and turns off the low-side switch LS in the phase circuit 111, such that the phase circuit 111 enters a charging state. When the driving signal PWM1 has the low logic value, the driver circuit D1 turns off the high-side switch HS in the phase circuit 111 and turns on the low-side switch LS in the phase circuit 111, such that the phase circuit 111 enters a discharging state. When the driving signal PWM1 has the middle logic value, the driver circuit D1 turns off the high-side switch HS in the phase circuit 111 and the low-side switch LS in the phase circuit 111, such that the phase circuit 111 is configured in an off state. As other driving signals PWM2-PWM8 and other phase circuits 112-118 have similar operations, and these similar operations are not described herein again.

In a period P1, since the pulses of the driving signals PWM1-PWM8 trigger in sequence, the phase circuits 111-118 enter the charging state sequentially. In other words, the phase circuit 111 is a first activation item, and the phase circuit 112 is a second activation item, and so on.

At a time point TP1 in the period P1, when the system enables the auto phase-shedding mechanism, an auto phase-shedding enable signal APS_EN changes from the low logic value to the high logic value, and it represents that the auto phase-shedding mechanism is enabled. At this time, the detector circuit 130 detects the currents (e.g., the detection currents I1-I8 in FIG. 2) or the temperatures (e.g., the detection temperatures T1-T8 in FIG. 2) of the phase circuits 111-118, and generates a detection result DR according to the maximum current and the highest temperature.

In practical applications, when the total current IOUT_TOTAL decreases, some phase circuits can be turned off to reduce the number of activation items. As illustrated in FIG. 3, taking the phase circuit 115 with the maximum current or the highest temperature as an example, in a period P2 (and subsequent periods), the controller 120 sets the next phase circuit 116 to be a new first activation item (i.e., an activation item with highest priority), and the controller 120 sets the phase circuit 117 to be a new second activation item, and so on. In other words, in the period P2 (and the subsequent periods), a pulse on the driving signal PWM6 is the first one to trigger, and a pulse on the driving signal PWM7 is the second one to trigger, and so on. Accordingly, in the period P2 (and the subsequent periods), the phase circuit 116 is the first one to enter the charging state, and the phase circuit 117 is the second one to enter the charging state, and so on. After the adjustments, the driving signal PWM5 corresponding to the maximum current or the highest temperature is kept at the low logic value in the period P2. The driver circuit D5 is configured to remain the phase circuit 115 in the discharging state according to the driving signal PWM5 (fixed at the low logic value without any pulse).

In a period P3, the phase circuit 116 is still the first activation item, and the phase circuit 117 is still the second activation item, and so on. In other words, in the period P3, a pulse on the driving signal PWM6 is still the first one to trigger, and a pulse on the phase circuit 117 is still the second one to trigger, and so on. In other words, in the period P3, the phase circuit 116 is still the first one to enter the charging state, and the phase circuit 117 is still the second one to enter the charging state, and so on. The driving signal PWM4 before the last driving signal PWM5 is kept at the low logic value in the period P3. The driver circuit D4 is configured to remain the phase circuit 114 in the discharging state according to the driving signal PWM4 (fixed at the low logic value without any pulse). The controller 120 controls the driving signal PWM5 to change from the low logic value to the middle logic value in the period P3. The driver circuit D5 controls the phase circuit 115 to remain in the off state according to the driving signal PWM5. In other words, the phase circuit 115 corresponding to the maximum current or the highest temperature is turned off. As subsequent periods have similar operations (e.g., the phase circuit 114 is turned off in the next period), further descriptions are omitted here.

The following paragraphs demonstrate embodiments about exiting the off state corresponding to the driving signal PWM4. Under a condition that the controller 120 has an internal threshold value (switching 4-phase to 3-phase) of 50 amps and a hysteresis value of 2 amps, the driving signal PWM4 has the middle logic value when the detection current I4 is lower than 50 amps. When the detection current I4 is larger than 52 amps, the driving signal PWM4 is switched from the middle logic value to the low logic value and is kept at the low logic value until the next charging cycle. Afterward, in the next charging cycle, the driving signal PWM4 will be switched from the low logic value to the high logic value in the next charging cycle. In another case, when the auto phase-shedding enable signal APS_EN changes to the low logic value, the driving signal PWM4 is switched from the middle logic value to the low logic value and is kept at the low logic value until the next charging cycle. Afterward, the driving signal PWM4 will be switched from the low logic value to the high logic value in the next charging cycle.

References are made to FIG. 1, FIG. 2, and FIG. 4. FIG. 4 is a timing diagram of a sequential definition manner under a power-saving mode according to some embodiments of the present disclosure.

In a period S1, since pulses of the driving signals PWM1-PWM8 trigger in sequence in the period S1, the phase circuits 111-118 enter the charging state in sequence. In other words, the phase circuit 111 is the first activation item, and the phase circuit 112 is the second activation item, and so on.

In a period S2, the driving signal PWM1 is still the first one to generate a pulse, and the driving signal PWM2 is still the second one to generate a pulse, and so on.

However, at a time point TP2 in the period S2, the power-saving mode command LP1 or the power-saving mode command LP2 changes from the low logic value to the high logic value, and a normal mode command NORMAL changes from the high logic value to the low logic value. It represents that the system enters a power-saving mode (a low-power mode or a sleep mode).

From the time point TP2 to a time point TP2' (a power-saving duration), the controller 120 is configured to trigger the pulse only on the driving signal PWM2 which is the second activation item originally in the period S1, and other driving signals PWM1 and PWM3-PWM8 are kept at the middle logic value (without any pulses). In other words, there is only one activation item during the power-saving duration. Accordingly, the driver circuit D2 controls the phase circuit 112 to enter the charging state according to the driving signal PWM2. Other driver circuits D1 and D3-D8 control the phase circuits 111 and 113-118 to remain in the off state according to other driving signals PWM1 and PWM3-PWM8 respectively.

After the time point TP2', taking the system turning back to the normal mode, according to the charging order in the period S1, the controller 120 defines the phase circuit 112 which is originally the second activation item in the period S1 as a new first activation item (with the highest priority), defines the next phase circuit 113 as a new second activation item, and so on. The phase circuit 111 is the last activation item (with lowest priority). For example, at the time point TP2', the power-saving mode command LP1 or the power-saving mode command LP2 changes from the high logic value to the low logic value and the normal mode command NORMAL changes from the low logic value to the high logic value, which represents that the system leaves the power-saving mode (which can be the low-power mode or the sleep mode). Then, the controller 120 controls the driver circuits D1-D8 according to the newly defined activation order.

In a period S3, the driving signal PWM2 which is the new first activation item is the first one to have a pulse, and the driving signal PWM3 which is the new second activation item is the second one to have a pulse, and so on.

However, taking a time point TP3 in the period S3 entering the power-saving mode again as an example, the power-saving mode command LP1 or the power-saving mode command LP2 changes from the low logic value to the high logic value again and the normal mode command NORMAL changes from the high logic value to the low logic value, it represents that the system enters the power-saving mode again.

From the time point TP3 to a time point TP3' (a power-saving duration), the controller 120 controls only the driving signal PWM3 which is the third activation item originally in the period S1 to have the pulses, and other driving signals PWM1-PWM2 and PWM4-PWM8 are kept at the middle logic value. In other words, there is only one activation item during the power-saving duration. Accordingly, the driver circuit D3 controls the phase circuit 113 to enter the charging state according to the driving signal PWM3. Other driver circuits D1-D2 and D4-D8 control the phase circuits 111-112 and 114-118 to remain in the off state according to the driving signals PWM1-PWM2 and PWM4-PWM8.

After the time point TP3', taking the system turning back to the normal mode as an example, according to the charging order in the period S1, the controller 120 defines the phase circuit 113 which is the third activation item originally in the period S1 to be a new first activation item (with highest priority), defines the next phase circuit 114 to be a new second activation item, and so on, and the phase circuit 112 is the last activation item (with lowest priority). For example, at the time point TP3', the power-saving mode command LP1 or the power-saving mode command LP2 changes from the high logic value to the low logic value and the normal mode command NORMAL changes from the low logic value to the high logic value, which represents that the system leaves the power-saving mode (the low-power mode or the sleep mode). Then, the controller 120 controls the driver circuits D1-D8 according to the newly defined activation order.

As subsequent periods have similar operations, further descriptions are omitted here. In the embodiments of FIG. 4, each of the phase circuits 112-118 and 111 in the power-saving mode is sequentially controlled to have the non-off state according to the charging order (or the activation order) in the period S1 while other phase circuits are controlled to remain in the off state, and thus the method adopted in FIG. 4 is called the "sequence defining method."

References are made to FIG. 1, FIG. 2, and FIG. 5. FIG. 5 is a timing diagram of a random defining method of a power-saving mode according to some embodiments of the present disclosure.

In a period K1, since the driving signals PWM1-PWM8 have pulses in sequence in the period K1, the phase circuits 111-118 enter the charging state in sequence. In other words, the phase circuit 111 is the first activation item, and the phase circuit 112 is the second activation item, and so on.

In a period K2, the phase circuit 111 is still the first one to have a pulse, and the driving signal PWM2 is still the second one to have a pulse, and so on.

However, at a time point TP4 in the period K2, the power-saving mode command LP1 or the power-saving mode command LP2 changes from the low logic value to the high logic value and the normal mode command NORMAL changes from the high logic value to the low logic value, which represents that the system enters the power-saving mode.

The phase circuit 115 is the present activated item at the time point TP4 when the system enters the power-saving mode. Therefore, from the time point TP4 to a time point TP4' (which is a power-saving duration), the controller 120 controls only the driving signal PWM5 configured to drive the present activated phase circuit 115 to generate the pulses, while other driving signals PWM1-PWM4 and PWM6-PWM8 are kept at the middle logic value. In other words, there is only one activation item during the power-saving duration. Accordingly, the driver circuit D5 controls the phase circuit 115 to enter the charging state according to the driving signal PWM5. Other driver circuits D1-D4 and D6-D8 control the phase circuits 111-114 and 116-118 to remain in the off state according to other driving signals PWM1-PWM4 and PWM6-PWM8.

After the time point TP4', taking the system back to the normal mode as an example, the controller 120 defines the phase circuit 115 to be a new first activation item (with highest priority), defines the next phase circuit 116 to be a new second activation item, and so on, and the phase circuit 114 is the last one activation item (with lowest priority). For example, at the time point TP4', the power-saving mode command LP1 or the power-saving mode command LP2 changes from the high logic value to the low logic value and the normal mode command NORMAL changes from the low logic value to the high logic value, it represents that the system leaves the power-saving mode (the low-power mode or the sleep mode). Then, the controller 120 controls the driver circuits D1-D8 according to the newly defined activation order.

In a period K3, the driving signal PWM5 which is the new first activation item is the first one to have a pulse, and the driving signal PWM6 which is the new second activation item is the second one to have a pulse, and so on.

However, taking a time point TP5 in the period K3 entering the power-saving mode again as an example, the power-saving mode command LP1 or the power-saving mode command LP2 changes from the low logic value to the high logic value again and the normal mode command NORMAL changes from the high logic value to the low logic value, which represents that the system enters the power-saving mode again.

The phase circuit 117 is the present activated item at the time point TP5 when the system enters the power-saving mode again. Therefore, from the time point TP5 to a time point TP5' (which is a power-saving duration), the controller 120 controls only the driving signal PWM7 configured to drive the present activated phase circuit 117 to generate the pulses, while other driving signals PWM1-PWM6 and PWM8 are kept at the middle logic value. In other words, there is only one activation item during the power-saving duration. Accordingly, the driver circuit D7 controls the phase circuit 117 to enter the charging state according to the driving signal PWM7. Other driver circuit D1-D6 and D8 control the phase circuits 111-116 and 118 to remain in the off state according to the driving signals PWM1-PWM6 and PWM8, respectively.

After the time point TP5', taking the system turning back to the normal mode as an example, the controller 120 defines the phase circuit 117 to be a new first activation item (with highest priority), defines the next phase circuit 118 to be a new second activation item, and so on, and the phase circuit 116 is the last activation item (with lowest priority). For example, at the time point TP5', the power-saving mode command LP1 or the power-saving mode command LP2 changes from the high logic value to the low logic value and the normal mode command NORMAL changes from the low logic value to the high logic value, which represents that the system leaves the power-saving mode (which can be the low-power mode or the sleep mode). Then, the controller 120 controls the driver circuits D1-D8 according to the newly defined activation order.

Subsequent periods have similar operations, so they are described herein again. In the embodiments of FIG. 5, in the power-saving mode, the present activated item (e.g., the phase circuit 115 or the phase circuit 117) at the time point (e.g., the time point TP4 or the time point TP5) when the power-saving mode command LP1 or the power-saving mode command LP2 changes from the low logic value to the high logic value is controlled to have the non-off state, and other phase circuits are controlled to remain in the off state, so it is called the "random defining method."

In some related art techniques, in the non-power-saving mode, the last phase circuit, the second to last phase circuit (and so on) are controlled to have the off state in sequence, and the first phase circuit is controlled to have the non-off state. In the power-saving mode, circuits other than the first phase circuit are controlled to have the off state, and the first phase circuit is controlled to have the non-off state. In these related approaches, the first phase circuit is always kept in the non-off state, so the utilization rate of the first phase circuit is much higher than those of other phase circuits. This reduces the reliability of multi-phase voltage converter.

Compared to the aforementioned related approaches, in the present disclosure, no matter in the non-power-saving mode or in the power-saving mode, each of the phase circuits 111-118 may be in the non-off state. In other words, the utilization rates of the phase circuits 111-118 are more evenly. Accordingly, the reliability of the multi-phase voltage converter 110 can be improved.

Reference is made to FIG. 6. FIG. 6 is a flow diagram of a control method 600 according to some embodiments of the present disclosure. The control method 600 includes operation S610 and operation S620.

In some embodiments, the control method 600 can be applied to the voltage conversion system 100 in FIG. 1, but the present disclosure is not limited thereto. Foe better understanding, the control method 600 is described with reference to FIG. 1 in following paragraphs.

In operation S610, the controller 120 controls the phase circuits 111-118 in the multi-phase voltage converter 110 to enter the charging state in sequence.

In operation S620, the controller 120 adjusts the first activation item according to the trigger event. Taking FIG. 3 as an example, in the non-power-saving mode, when the total current IOUT_TOTAL decreases and the phase circuit 115 has the maximum current or the highest temperature, the controller 120 outputs the driving signal PWM5 to the driver circuit D5 such that the driver circuit D5 controls the phase circuit 115 to remain in the discharging state in a next period, and the controller 120 outputs the driving signals PWM6-PWM8 and PWM1-PWM4 to the driver circuits D6-D8 and D1-D4 respectively such that the driver circuits D6-D8 and D1-D4 adjust the phase circuit 116 to be the activation item with highest priority and control the phase circuits 116-118 and 111-114 to enter the charging state in sequence in the next period.

Since the details of the operation S610 and operation S620 are described in the paragraphs related to FIG. 3 to FIG. 5, they are not described herein again.

As described above, the reliability of the multi-phase voltage converter can be effectively improved.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A voltage conversion system, comprising:
a multi-phase voltage converter coupled to a load and comprising:
a first phase circuit;
a second phase circuit;
a third phase circuit, wherein the first phase circuit, the second phase circuit, and the third phase circuit enter a charging state in sequence during a first period; and
at least one driver circuit coupled to the first phase circuit, the second phase circuit, and the third phase circuit; and
a controller coupled to the at least one driver circuit, wherein according to a trigger event, the controller outputs at least one driving signal to the at least one driver circuit such that the at least one driver circuit adjusts the second phase circuit or the third phase circuit to be an activation item with highest priority during a second period after the first period,
wherein when the trigger event is that a total current decreases and the second phase circuit has a maximum current or a highest temperature in a non-power-saving mode, the controller outputs the at least one driving signal to the at least one driver circuit such that during the second period after the first period, the at least one driver circuit adjusts the third phase circuit to be the activation item with highest priority, controls the third phase circuit and the first phase circuit to enter the charging state in sequence, and controls the second phase circuit to remain in a discharging state.

2. The voltage conversion system of claim 1, wherein each of the first phase circuit, the second phase circuit, and the third phase circuit comprises a high-side switch and a low-side switch,
wherein when the second phase circuit is in the charging state, the high-side switch of the second phase circuit is turned on and the low-side switch of the second phase circuit is turned off,
wherein when the second phase circuit is in the discharging state, the high-side switch of the second phase circuit is turned off and the low-side switch of the second phase circuit is turned on.

3. The voltage conversion system of claim 1, wherein, during a third period after the second period, the controller controls the third phase circuit to enter the charging state, controls the first phase circuit to remain in the discharging state, and controls the second phase circuit to remain in an off state.

4. The voltage conversion system of claim 3, wherein each of the first phase circuit, the second phase circuit, and the third phase circuit comprises a high-side switch and a low-side switch,
wherein when the second phase circuit is in the off state, the high-side switch of the second phase circuit and the low-side switch of the second phase circuit are turned off.

5. A voltage conversion system, comprising:
a multi-phase voltage converter coupled to a load and comprising:
a first phase circuit;
a second phase circuit;
a third phase circuit, wherein the first phase circuit, the second phase circuit, and the third phase circuit enter a charging state in sequence during a first period; and
at least one driver circuit coupled to the first phase circuit, the second phase circuit, and the third phase circuit; and
a controller coupled to the at least one driver circuit, wherein according to a trigger event, the controller outputs at least one driving signal to the at least one driver circuit such that the at least one driver circuit adjusts the second phase circuit or the third phase circuit to be an activation item with highest priority during a second period after the first period,
wherein when the trigger event is a power-saving mode, during a first power-saving duration after the first period, the controller controls the second phase circuit to enter the charging state according to a charging order of the first period, and controls the first phase circuit and the third phase circuit to remain in an off state, and the controller adjusts the second phase circuit to be the activation item with highest priority and the first phase circuit to be an activation item with lowest priority according to the charging order.

6. The voltage conversion system of claim 5, wherein in the power-saving mode, the controller controls the third phase circuit to enter the charging state and controls the first phase circuit and the second phase circuit to remain in the off state during a second power-saving duration after the first power-saving duration.

7. A voltage conversion system, comprising:
a multi-phase voltage converter coupled to a load and comprising:
a first phase circuit;
a second phase circuit;
a third phase circuit, wherein the first phase circuit, the second phase circuit, and the third phase circuit enter a charging state in sequence during a first period; and
at least one driver circuit coupled to the first phase circuit, the second phase circuit, and the third phase circuit; and
a controller coupled to the at least one driver circuit, wherein according to a trigger event, the controller outputs at least one driving signal to the at least one driver circuit such that the at least one driver circuit adjusts the second phase circuit or the third phase circuit to be an activation item with highest priority during a second period after the first period, wherein when the trigger event is a power-saving mode, under a condition that the second phase circuit is a present activated phase circuit while a power-saving mode command switching to a high logic value, during a first power saving duration, the controller controls the second phase circuit to enter the charging state, and the controller controls the first phase circuit and the third phase circuit to remain in an off state, and the controller adjusts the second phase circuit to be the activation item with highest priority and the first phase circuit to be an activation item with lowest priority.

8. The voltage conversion system of claim 7, wherein the multi-phase voltage converter further comprises a fourth phase circuit,
wherein the first phase circuit, the second phase circuit, the third phase circuit, and the fourth phase circuit enter the charging state in sequence during the first period,
wherein in the power-saving mode, under a condition that the fourth phase circuit is the present activated phase circuit while the power-saving mode command switching to the high logic value again, during a second power-saving duration, the controller controls the fourth phase circuit to enter the charging state, and the controller controls the first phase circuit, the second phase circuit, and the third phase circuit to remain in the off state.

* * * * *